United States Patent Office 2,732,399
Patented Jan. 24, 1956

2,732,399

PROCESS FOR SEPARATING ISOPHTHALIC ACID AND TEREPHTHALIC ACID MIXTURES

Earl F. Carlston and Funston G. Lum, Richmond, Calif., assignors to California Research Corporation, San Francisco, Calif., a corporation of Delaware No Drawing. Application January 2, 1953, Serial No. 329,470

11 Claims. (Cl. 260—525)

This invention is directed to a process for separating mixtures of isophthalic acid and terephthalic acid.

Isophthalic acid and terephthalic acid are commonly prepared by the oxidation of meta-xylene and para-xylene, respectively. These isomeric xylenes are exceedingly difficult to separate by conventional means due to the close similarity of their physical properties. Separation of the mixed isophthalic acid and terephthalic acid produced by oxidation of isomeric mixtures of metaxylene and para-xylene, has, therefore, been suggested as an alternative. Unfortunately, however, the separation of mixtures of isophthalic acid and terephthalic acid also involves serious problems. Conventional methods of separation such as fractional distillation as applied to mixtures of these acids are impractical, since terephthalic acid and isophthalic acid have such high melting points.

It has now been discovered that mixtures of alkali metal salts of terephthalic acid and isophthalic acid can be effectively separated by intimately mixing the salts with a concentrated aqueous solution of a water-miscible alcohol, said aqueous solution being insufficient to dissolve all of the mixed alkali metal phthalic acid salts, and separating a solid phase and a liquid phase.

By the process according to this invention, it is possible to separate mixtures of isophthalic acid and terephthalic acid into essentially pure isophthalic acid and terephthalic acid. The water-miscible alsohol employed in the process is readily recovered by conventional methods as, for example, simple distillation, and may be reused indefinitely. The isophthalic acid and terephthalic acid salts obtained in the process are free of contaminants such as inorganic salts which may be found in the products of processes employing them as reagents. The necessity of careful control of temperatures and washing rates sometimes associated with separation processes employing water alone may also be largely avoided by the present process.

In the present process the isophthalic acid and terephthalic acid are converted to their alkali metal salts by any suitable means known to the art. Upon intimately mixing the alkali metal isophthalate and alkali terephthalate mixture with concentrated aqueous solutions of water-miscible alcohol and separating a solid phase and a liquid phase, substantially pure alkali metal isophthalate or substantialy pure alkali meta terephthalate, or both, are obtained. When the concentrated aqueous solution of water-miscible alcohol is not only insufficient to dissolve all of the alkali metal phthalate mixture, but also insufficient to dissolve all of the more soluble alkali metal isophthalate, the liquid phase consists of substantially pure alkali metal isophthalate in aqueous solution along with the water-miscible alcohol. When the concentrated aqueous solution of water-miscible alcohol is employed in an amount insufficient to dissolve all of the alkali metal phthalate mixture, but sufficient to dissolve all of the alkali metal isophthalate as well as part of the alkali metal terephthalate, the solid phase consists of substantially pure alkali metal terephthalate. When the concentrated aqueous solution of water-miscible alcohol is insufficient to dissolve all of the alkali metal phthalate mixture, but just sufficient to dissolve all of the alkali metal isophthalate, a substantially complete separation of the alkali metal isophthalate and alkali metal terephthalate results.

It is also possible in accordance with the practice of this invention to effect a substantially complete separation of the alkali metal isophthalate and alkali metal terephthalate mixture by adding a water-miscible alcohol to a complete aqueous solution of the alkali metal isophthalate and alkali metal terephthalate mixture. Sufficient water is added to the alkali metal isophthalate and alkali metal terephthalate to completely dissolve the salts and then a water-miscible alcohol is added with stirring in an amount just sufficient to form a solution saturated with all of the alkali metal isophthalate present in the phthalate mixture. A solid phase and a liquid phase are separated, the solid phase consisting of essentially pure alkali metal terephthalate and the liquid phase consisting of essentially pure alkali metal isophthalate in aqueous solution along with the water-miscible alcohol.

The process of separating isophthalic acid and terephthalic acid according to this invention is adaptable to mixtures of any alkali metal salts of isophthalic acid and terephthalic acid. The term "alkali metal salt" as used throughout the specification and claims includes ammonium salts as well as salts of the true alkali metal such as sodium and potassium. The salts as mentioned previously may be prepared from the acids or their various derivatives according to conventional methods. They may be prepared directly from the isophthalic acid and terephthalic acid by neutralization with sodium hydroxide, potassium hydroxide, or ammonium hydroxide. Dialkyl esters of the acids and lower alkyl alcohols may be converted by saponification with a slight excess of aqueous sodium hydroxide, potassium hydroxide, etc. Acid-amide mixtures of isophthalic acid and terephthalic acid made by oxidation of mixtures of meta-xylene and para-xylene according to the process of U. S. Patent No. 2,610,980, to Naylor, are convertible to the alkali metal salts by caustic hydrolysis with aqueous sodium hydroxide or potassium hydroxide.

The process of the invention is also applicable to mixtures of isophthalic acid and terephthalic acid containing ortho-phthalic acid, benzoic acid, toluic acids, etc. such as may be obtained by the oxidation of natural crude xylenes. No change in the process is required because of these other organic acids. The separated alkali metal isophthalate in aqueous alcohol solution and the alkali metal terephthalate cake are merely acidified in aqueous solution with mineral acids to liberate the isophthalic acid and terephthalic acid as solids. The solid isophthalic acid and solid terephthalic acid are then washed with water, whereupon the more soluble organic acids are removed in the water washes.

Any water-miscible alcohol may be employed in the concentrated aqueous solution. Such alcohols include the lower alkyl alcohols as, for example, methyl alcohol, ethyl alcohol, n-propyl alcohol, isopropyl alcohol, and the like. Isopropyl alcohol is presently preferred since it is economical to use and readily available. The water-miscible alcohol in the aqueous solution may be present in various amounts, but concentrated solutions containing at least 1 part by volume of alcohol to 1 part by volume of water are desired. Preferably, the ratio of alcohol to water ranges from about 2:1 to about 6:1 on a volume basis.

As already stated, the amount of concentrated aqueous solution of water-miscible alcohol employed in separating the alkali metal isophthalate and alkali metal terephthalate mixtures may be any amount insufficient to dissolve all of the salts when the mixture has been brought into equilibrium as by intimate mixing of the solid and liquid phases. The amount of aqueous solution of any particular water-miscible alcohol in any given concentration which is just sufficient to entirely dissolve the alkali metal isophthalate may be simply determined. Measured amounts of the alkali metal isophthalate are added to the aqueous solution of water-miscible alcohol at the desired temperature of operation until the solution has become saturated with respect to the alkali metal isophthalate and begins to form a solid phase. From such measurements the amount of concentrated aqueous solution of water-miscible alcohol required to just dissolve all of the alkali metal isophthalate present in any given mixture may be readily calculated.

Separations of mixtures of alkali metal isophthalate and alkali metal terephthalate may be carried out at any practical temperature. Room temperatures such as about 25° C. are particularly convenient, since they require neither heating nor cooling. Very effective separations may also be accomplished at higher temperatures, even exceeding the boiling point of the concentrated aqueous solutions when superatmospheric pressures are employed.

The solid phase and the liquid phase formed in the process according to this invention are conveniently separated by any of the commonly known methods for separating solids from liquids. Such methods include sedimentation as in the case of continuous rotating thickeners, centrifuges, and the like. For present purposes filtration with vacuum or centrifuge has been found a very practical means of separation. Decantation may be resorted to when complete phase separation is not required as, for example, when mere enrichment of the terephthalate over the proportion present in the original mixture is desired.

The solid phase separated by sedimentation, filtration, etc. from the intimate mixture of aqueous water-miscible alcohol solution and the alkali metal isophthalate and alkali metal terephthalate mixture contains the alkali metal terephthalate in enriched proportions. Mother-liquor adhering to the solid phase precipitate or filter cake may contain alkali metal isophthalate in solution or certain amounts of alkali metal isophthalate may be present in the solid phase. The alkali metal terephthalate, if desired, may be purified of such alkali metal isophthalate by repeated washing of the solid phase precipitate or filter cake with concentrated aqueous solutions of water-miscible alcohol.

In addition to the use of concentrated solutions of water-miscible alcohols as washing liquids, it is also possible to use water alone as a wash liquid. The use of water, however, may require an efficient countercurrent washing system with careful control of temperature and washing rates as well as frequent inspection of the filtration obtained.

The following simplified examples are offered as further illustrations of the invention. Unless otherwise specified, the proportions given are on a weight basis.

*Example 1*

166 parts of a mixture of isophthalic acid and terephthalic acid containing approximately 75% isophthalic acid and 25% terephthalic acid by spectroscopic analysis were added to a mixture of 112 parts of water and 122 parts of ammonium hydroxide solution containing approximately 35 parts of $NH_3$. The mixture became hot, but was not boiled. The insoluble ammonium terephthalate was separated by filtration at room temperature. The filter cake was washed with a mixture of isopropanol and water (3:1 by volume) to remove the mother-liquor containing ammonium isophthalate. The ammonium terephthalate cake was then dissolved in water and hydrochloric acid was added slowly in excess to precipitate the terephthalic acid. The terephthalic acid was filtered and washed repeatedly with water until the filtrate was free of hydrochloric acid, ammonium chloride, and isophthalic acid. The terephthalic acid filter cake on drying showed a yield of 39.5 parts by weight, or approximately 95% of the terephthalic acid in the original mixture.

The alcohol-water wash solution filtrates were all combined and boiled to recover the isopropanol by distillation. After the alcohol was recovered the remaining water solution was combined with the ammonium isophthalate solution filtrate. Hydrochloric acid was added slowly in excess and the isophthalic acid was recovered on a filter. After repeatedly washing the filter cake with water to remove all of the hydrochloric acid and ammonium chloride, substantially complete recovery of the isophthalic acid in the original solution was obtained.

*Example 2*

16.6 parts of a mixture of isophthalic acid and terephthalic acid containing approximately 75% isophthalic acid and 25% terephthalic acid by spectroscopic analysis were added to a mixture of 105 parts of water and 12.2 parts of ammonium hydroxide solution containing approximately 3.5 parts of $NH_3$. Three hundred and fifty milliliters of isopropanol were added to the solution at room temperature. The precipitated ammonium terephthalate was filtered off and washed with a mixture of isopropanol and water (3:1 by volume) to remove mother-liquor containing ammonium isophthalate. The ammonium terephthalate cake was then dissolved in water and filtered, and hydrochloric acid was added slowly in excess to precipitate the terephthalic acid. The terephthalic acid was filtered and washed repeatedly with water until the filtrate was free of hydrochloric acid, ammonium chloride, and isophthalic acid. The terephthalic acid filter cake on drying showed a yield of 3.5 parts by weight, or approximately 85% of the terephthalic acid in the original mixture.

The alcohol-water solution filtrates were all combined and boiled to recover the isopropanol by distillation. After the alcohol was recovered, hydrochloric acid was added to the solution in excess and the isophthalic acid was filtered off. After repeatedly washing the filter cake with water to remove all of the hydrochloric acid and ammonium chloride, substantially complete recovery of the isophthalic acid and the terephthalic acid not separated was obtained.

We claim:

1. A process for separating mixtures of an alkali metal salt of isophthalic acid and the same alkali metal salt of terephthalic acid which comprises forming an intimate mixture of the salts with a concentrated aqueous solution of a water-miscible alcohol, said aqueous solution being insufficient to dissolve all of the mixed alkali metal phthalates and separating a solid phase and a liquid phase from the intimate mixture.

2. A process for separating mixtures of ammonium isophthalate and ammonium terephthalate which comprises forming an intimate mixture of the phthalates with a concentrated aqueous solution of a water-miscible alcohol, said aqueous solution being insufficient to dissolve all of the ammonium phthalates and separating a solid phase and a liquid phase from the intimate mixture.

3. A process for separating mixtures of sodium isophthalate and sodium terephthalate which comprises forming an intimate mixture of the phthalates with a concentrated aqueous solution of a water-miscible alcohol, said aqueous solution being insufficient to dissolve all of the sodium phthalates and separating a solid phase and a liquid phase from the intimate mixture.

4. A process for separating mixtures of potassium isophthalate and potassium terephthalate which comprises forming an intimate mixture of the phthalates with a concentrated aqueous solution of a water-miscible alcohol, said aqueous solution being insufficient to dissolve all of the potassium phthalates and separating a solid phase and a liquid phase from the intimate mixture.

5. A process for separating mixtures of ammonium isophthalate and ammonium terephthalate which comprises forming an intimate mixture of the phthalates with a concentrated aqueous solution of a water-miscible alcohol, said aqueous solution being insufficient to dissolve all of the ammonium phthalates, but at least sufficient to dissolve all of the ammonium isophthalate and separating a solid phase and a liquid phase from the intimate mixture, said solid phase being substantially pure ammonium terephthalate.

6. A process for separating mixtures of ammonium isophthalate and ammonium terephthalate which comprises forming an intimate mixture of phthalates with a concentrated aqueous solution of a water-miscible alcohol, said aqueous solution being insufficient to dissolve all of the ammonium isophthalate and separating a solid phase and a liquid phase from the intimate mixture, said liquid phase being an aqueous solution of substantially pure ammonium isophthalate and water-miscible alcohol.

7. A process for separating mixtures of ammonium isophthalate and ammonium terephthalate which comprises forming an intimate mixture of the phthalates with a concentrated aqueous solution of a water-miscible alcohol, said aqueous solution being sufficient to form a saturated solution of all the ammonium isophthalate present, and separating a solid phase and a liquid phase from the intimate mixture, said solid phase being substantially pure ammonium terephthalate and said liquid phase being an aqueous solution of substantially pure ammonium isophthalate and water-misicible alcohol.

8. A process for separating mixtures of ammonium isophthalate and ammonium terephthalate which comprises dissolving said mixtures in water, adding a water-miscible alcohol in amount sufficient to form a solid phase and a liquid phase and separating said solid phase and said liquid phase.

9. A process for separating mixtures of ammonium isophthalate and ammonium terephthalate which comprises forming an intimate mixture of the phthalates with a concentrated aqueous solution of a water-miscible alcohol, said aqueous solution being sufficient to form a saturated solution with all of the ammonium isophthalate present, separating a solid phase and a liquid phase from the intimate mixture and washing the solid phase with a concentrated aqueous solution of a water-miscible alcohol.

10. A process for separating mixtures of isophthalic acid and terephthalic acid which comprises forming an intimate mixture of an alkali metal salt thereof with a concentrated aqueous solution of a water-miscible alcohol, said aqueous solution being sufficient to form a saturated solution with all of the alkali metal isophthalate present, separating a solid phase and a liquid phase from the intimate mixture, said solid phase being substantially pure alkali metal terephthalate and said liquid phase being an aqueous solution of substantially pure alkali metal isophthalate and a water-miscible alcohol, recovering the alcohol and reconverting the separated alkali metal terephthalate and alkali metal isophthalate phases to phthalic acids by acidification with mineral acid.

11. A process for separating mixtures of isophthalic acid and terephthalic acid which comprises converting the acids to their ammonium salts, forming a slurry of the ammonium salts with a concentrated aqueous solution of isopropanol in which the ratio of isopropanol to water ranges from about 2:1 to about 6:1 on a volume basis, separating the solid phase ammonium terephthalate and reconverting it to terephthalic acid, evaporating the water and isopropanol from the liquid phase aqueous isopropanol solution of ammonium isophthalate and reconverting it to isophthalic acid.

References Cited in the file of this patent

UNITED STATES PATENTS 2,531,173    Toland _____ Nov. 21, 1950

FOREIGN PATENTS 623,836    Great Britain _____ May 24, 1949

OTHER REFERENCES

Fittig et al.: Liebigs ann., vol. 148, pp. 11–23 (1868).
McMaster: Am. Chem. J., vol. 49, p. 298 (1913).
Scheurer et al.: J. Am. Chem. Soc., vol. 72, pp. 3308–9 (1950).